No. 775,353.  
PATENTED NOV. 22, 1904.  
M. VON ROHR.  
LENS COMBINATION FOR PRODUCING VIRTUAL IMAGES.  
APPLICATION FILED FEB. 23, 1904.  
NO MODEL.

Witnesses:  
Paul Krüger  
Fritz Sander

Inventor:  
Moritz von Rohr

No. 775,353.

Patented November 22, 1904.

UNITED STATES PATENT OFFICE.

MORITZ VON ROHR, OF JENA, GERMANY, ASSIGNOR TO THE FIRM OF CARL ZEISS, OF JENA, GERMANY.

LENS COMBINATION FOR PRODUCING VIRTUAL IMAGES.

SPECIFICATION forming part of Letters Patent No. 775,353, dated November 22, 1904.

Application filed February 23, 1904. Serial No. 194,939. (No model.)

*To all whom it may concern:*

Be it known that I, MORITZ VON ROHR, doctor of philosophy, a citizen of the Kingdom of Prussia, residing at Carl-Zeiss Strasse, Jena, in the Grand Duchy of Saxe-Weimar, German Empire, have invented a new and useful Lens Combination for Producing Virtual Images, of which the following is a specification.

The invention consists in an improved lens combination designed to show to the observing eye placed behind it at a large distance and at a widened angle a virtual image of a more or less plane object situated before the lens system within or in proximity of the focal plane. The said object may be a material one or only an optical image—real or virtual. Thus lens combinations may be constructed according to the invention for use as magnifiers or as glasses for reading or for viewing photographs or other pictures, the latter glasses being suitable to serve both as single instruments for monocular inspection of a photograph or the like and in binocular form for exhibiting two photographs to the two eyes of the observer. It will be understood that the binocular instrument can be used either for indifferent two-eyed vision, when the impression gained is practically the same as with the single glass, two copies of the same photograph being used, or for stereoscopic vision, which requires a pair of stereopositives. On the other hand, the improved lens combination may be constructed for use as eye-lens of an eyepiece composed of two separate lens systems, the object being a real image in the case of Huygens eyepieces and a virtual image in the case of Ramsden eyepieces.

The present improved lens combination of above kind is composed of two separate lens systems, a positive one and a negative one. It is not only chromatically corrected in a sufficient degree to display no color dispersion, but also orthoscopic, yielding of a plane object an image free of distortion. The back lens system—*i. e.*, the lens system nearest the eye—as well as the front lens system may be composed each of two lenses cemented together, or one or both of them may consist only of a single lens. The air-space between both systems has such a shape that the two surfaces confining this space and facing each other—the so-called pair of "facing surfaces"—possess together the same (positive or negative) sign—*i. e.*, produce the same (collective or dispersive) effect as the back lens system.

Figure 1:
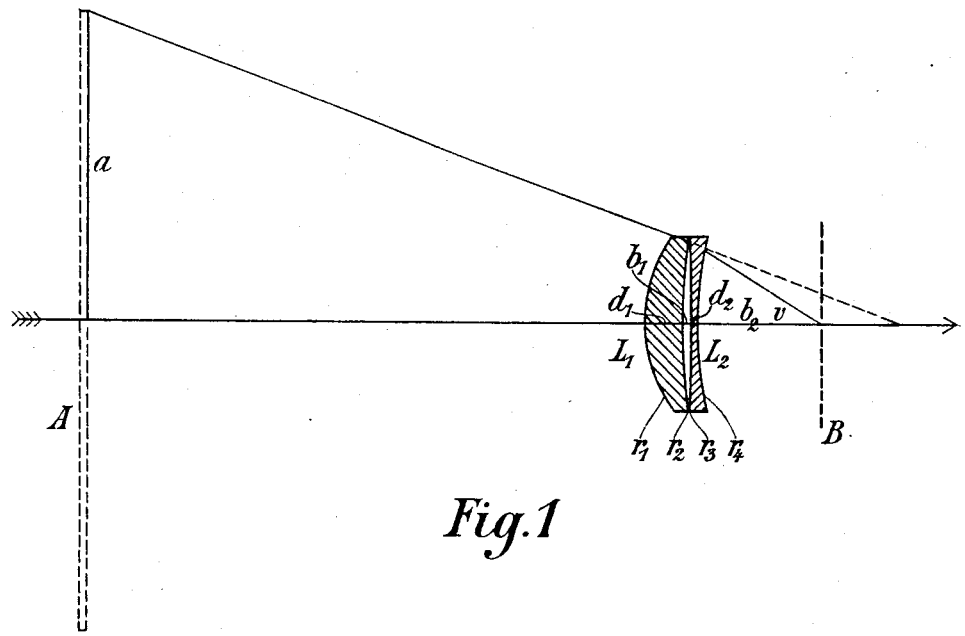
Figure 2:
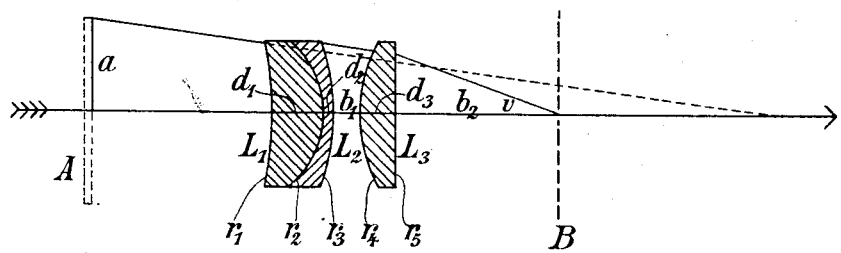

In the accompanying drawings, Figure 1 represents a lens combination constructed according to the invention. Fig. 2 represents another lens combination constructed according to the invention.

In both figures the arrow points out the direction of the light coming from the side of the object A. The back diaphragm B (indicated by two dotted lines) does not really exist, its place being taken by the observer's eye. Under this assumption each of both lens combinations is corrected for distortion through the whole field, the extension of which is determined by the radius $a$ of the object A or the inclination $v$ of the emerging marginal ray, with only insignificant deviations as are due to the zones of distortion. As to the stigmatism of oblique pencils, the remaining astigmatic aberrations are only secondary, (also due to zones.) Aberrations due to curvature of the field of the image are compensated by the accommodation of the eye.

The lens combination shown in Fig. 1, having the magnifying power 2.5, is designed for viewing photographs. Its equivalent focal distance $f_D$ for rays whose wave length is given by the spectral line D is one hundred millimeters. The radii, thicknesses, and distances are: $r_1$ equals 22.932, $r_2$ equals 120.0, $r_3$ equals 388.92, $r_4$ equals 73.0, $d_1$ equals 7.5, $b_1$ equals 1.5, $d_2$ equals 1.5, $b_2$ equals 25.0 millimeters. The lens $L_1$, representing the front system, is constructed of the borosilicate crown $O^{144}$, and the lens $L_2$, representing the back system, of the ordinary silicate flint $O^{118}$.

The lens combination shown in Fig. 2, being spherically corrected and having the magnifying power 5.0, is designed for use as a magnifier and may in a reduced size also be substituted for the eye-lens of telescopic eyepieces. Its equivalent focal distance $f_D$ is fifty millimeters. The radii, thicknesses, and distances are: $r_1$ equals 67.0, $r_2$ equals 18.0, $r_3$ equals 41.7, $r_4$ equals 29.0, $r_5$ equals $\infty$, $d_1$ equals 10.0, $d_2$ equals 2.0, $b_1$ equals 5.0, $d_3$ equals 7.0, $b_2$ equals 32.0 millimeters.

The front lens $L_1$ of the front system is constructed of the borosilicate crown $O^{802}$, the back lens $L_2$ of this system of the ordinary silicate flint $O^{103}$, and the lens $L_3$, representing the back system, of the borosilicate crown $O^{144}$.

What I claim as my invention, and desire to secure by Letters Patent, is—

1. A chromatically-corrected and orthoscopic lens combination for observing an object placed in the focal plane, consisting of two separate lens systems, a positive one and a negative one, the sign of the pair of facing surfaces being the same as that of the back lens system.

2. A chromatically-corrected and orthoscopic lens combination for viewing a photograph placed in the focal plane, consisting of two separate single lenses, a positive one and a negative one, the sign of the pair of facing surfaces being the same as that of the back lens system.

In testimony whereof I have signed my name to this specification in the presence of two subscribing witnesses.

MORITZ VON ROHR.

Witnesses:
  PAUL KRÜGER,
  FRITZ SANDER.